United States Patent [19]

Kessler et al.

[11] Patent Number: 4,482,254

[45] Date of Patent: Nov. 13, 1984

[54] FLUID MIXING APPARATUS AND METHOD

[75] Inventors: Erich Kessler, Hoechst; Alfons Leeb, Kleinwallstadt, both of Fed. Rep. of Germany

[73] Assignee: Akzo N.V., Arnhem, Netherlands

[21] Appl. No.: 464,560

[22] Filed: Feb. 7, 1983

[30] Foreign Application Priority Data

Feb. 9, 1982 [DE] Fed. Rep. of Germany ....... 3204357
Jan. 14, 1983 [DE] Fed. Rep. of Germany ....... 3301043

[51] Int. Cl.³ .............................................. B01F 7/24
[52] U.S. Cl. ..................................... 366/177; 366/291;
366/302; 366/318; 366/329
[58] Field of Search ................. 366/76, 79, 91, 96,
366/97, 98, 99, 177, 302, 304, 307, 310, 318,
290, 291, 329; 425/206, 207, 208

[56] References Cited

U.S. PATENT DOCUMENTS 3,291,076 12/1966 Flanigan ............................. 366/302
3,362,919 1/1968 Rood ................................... 366/329
3,774,887 11/1973 Dunn ................................... 366/76
4,140,299 2/1979 Henderson et al. .
4,324,493 4/1982 Colombo ............................. 366/79

Primary Examiner—Robert W. Jenkins
Assistant Examiner—Arthur D. Dahlberg
Attorney, Agent, or Firm—Bell, Seltzer, Park & Gibson

[57] ABSTRACT

An apparatus and method for mixing two or more distinct fluids is disclosed, and which includes a housing, a sleeve fixedly mounted in the housing and defining a mixing chamber, and a rotatable mixing head having a grooved outer surface disposed in the mixing chamber. At least one of the fluids is fed radially through the sleeve and into the mixing chamber, so as to be sheared and highly dispersed in the mixing chamber by contact with the rotating mixing head. In one embodiment, the sleeve includes a plurality of distinct openings for permitting the passage of the fluid, and in another embodiment the sleeve is composed of a porous metallic material, with the pores of the material defining the openings for the passage of the fluid.

26 Claims, 5 Drawing Figures

FLUID MIXING APPARATUS AND METHOD

The present invention relates to an apparatus and method for mixing distinct fluids to obtain an essentially homogeneous mixture.

German Offenlegungsschrift No. 25 29 987, and corresponding U.S. Pat. No. 4,140,299 describe a mixing device which comprises a cylindrical body disposed in a cooperating casing, with the body having a plurality of helical grooves on the external surface. A large amount of a first liquid is adapted to be fed axially into the casing, and a small quantity of a second liquid is adapted to be fed through an inlet which is radially disposed with respect to the cylindrical body. Where it is desired that the second liquid be highly dispersed to facilitate its mixture with the first liquid, a plurality of concentric annular bodies are provided, together with a plurality of radial inlets associated with each of the annular bodies. This construction results in a very complicated design, and the device must be disassembled into several components to permit cleaning, which is a time consuming and tedious operation. Further, flow conditions in the mixing chamber are not fully controllable, since the liquid delivery lines run through the mixing chamber.

It is accordingly an object of the present invention to provide a fluid mixing apparatus and method which effectively avoids the above noted disadvantages.

It is a further object of the present invention to provide a fluid mixing apparatus and method which is able to achieve controlled, reproduceable flow conditions, which provides good mixing results, and wherein the apparatus may be readily cleaned.

These and other objects and advantages of the present invention are achieved in the embodiment illustrated herein by the provision of a mixing apparatus which includes a housing, a sleeve fixedly mounted in the housing and having an inner cylindrical surface which defines a mixing chamber therewithin, and a mixing head rotatably mounted in the sleeve, with the mixing head having an outer cylindrical surface which is in close proximity to the inner surface of the sleeve. The mixing head further includes at least one helical groove formed in the outer surface thereof. Also, the apparatus includes first duct means including a plurality of openings extending radially through the sleeve for conveying a first fluid radially into the mixing chamber, and additional duct means for conveying an additional fluid into the mixing chamber. Upon rotation of the mixing head, the first fluid which radially enters the mixing chamber is adapted to be sheared by contact with the grooved exterior surface of the rotating mixing head, to form a fine dispersion which is mixed with the additional fluid.

In the preferred embodiment, the mixing apparatus further includes a second mixing chamber positioned downstream of the first mixing chamber, and the additional duct means includes a plurality of additional openings extending radially through the sleeve for conveying the additional fluid radially into the mixing chamber in a manner equivalent to that of the first fluid.

The openings in the sleeve may take the form of a plurality of distinct, radial holes, which are arranged in axially extending sets of equally spaced apart openings. Alternatively, the sleeve may be composed of a porous sintered metallic material, with the pores of the material defining the openings. In this latter embodiment, the fluids which are fed through the sleeve are suppplied to the mixing head in a highly dispersed, partly pre-mixed condition, since the fluids are divided into myriad streams and tend to mix with one another during passage through the wall of the sleeve. The average size of the pores in the porous metallic material typically ranges between 5 and 200 microns.

The width of the space formed between the sleeve and the mixing head typically ranges between about 0.2 and 5 mm. A more narrow space provides an increased shearing effect, whereas a wider space provides an increased remixing effect as further described below. The shearing effect is achieved by reason of the fact that the streams of the fluids emerging from the sleeve are sheared between the sleeve and the mixing head, and with the mixing head rotating at high speeds, a fine dispersion and thorough mixing of the stream may be achieved. For this reason, the mixing apparatus of the present invention permits the addition of fluid components to a variety of materials which can be sheared, such as polymer melts, greases, waxes, pastes, as well as other liquids and gases.

The re-mixing effect may be achieved where the mixing head conveys in the conveying direction a substantially greater amount of the fluid than can be discharged through the exit of the mixing apparatus. On the other hand, the re-mixing effect can also be achieved if the mixing head is rotated so as to convey the fluid in opposition to the direction of flow, as described in the above noted German and U.S. patents.

It is also preferred that each of the first and additional duct means for the fluids includes a plurality of axially extending channels formed in the housing and communicating with the associated openings at the outer surface of the sleeve. Thus for example, where two components are to be mixed, the axial channels may be arranged such that each channel is connected to one of the component feed lines, and so that the components, after being dispersed within the sleeve, are equally distributed over the circumference of the mixing head. Alternatively, the channels formed in the housing may extend in a circumferential direction.

The mixing apparatus according to the present invention is particularly adapted to permit a very small quantity of one liquid to be added to a main liquid stream, for example, at a ratio of 100 to 1. In such case, the main liquid stream is not conveyed radially through openings of the sleeve, but rather may be conveyed axially into one end of the mixing chamber defined by the sleeve.

Some of the objects having been stated, other objects and advantages of the invention will appear as the description proceeds, when taken in connection with the accompanying drawings, in which.

Figure 1:
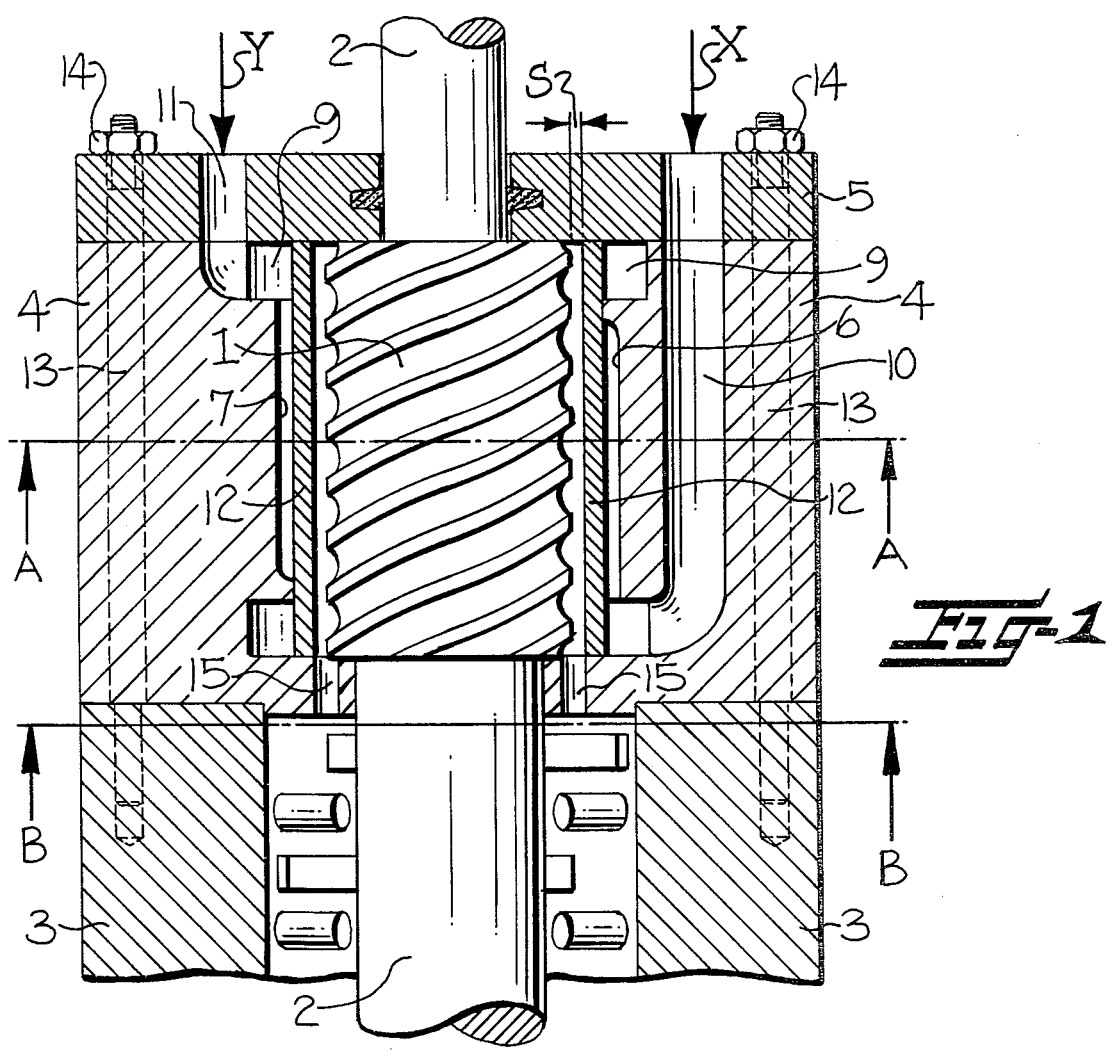
FIG. 1 is a sectional elevation view taken through a mixing apparatus which embodies the features of the present invention.
Figure 2:
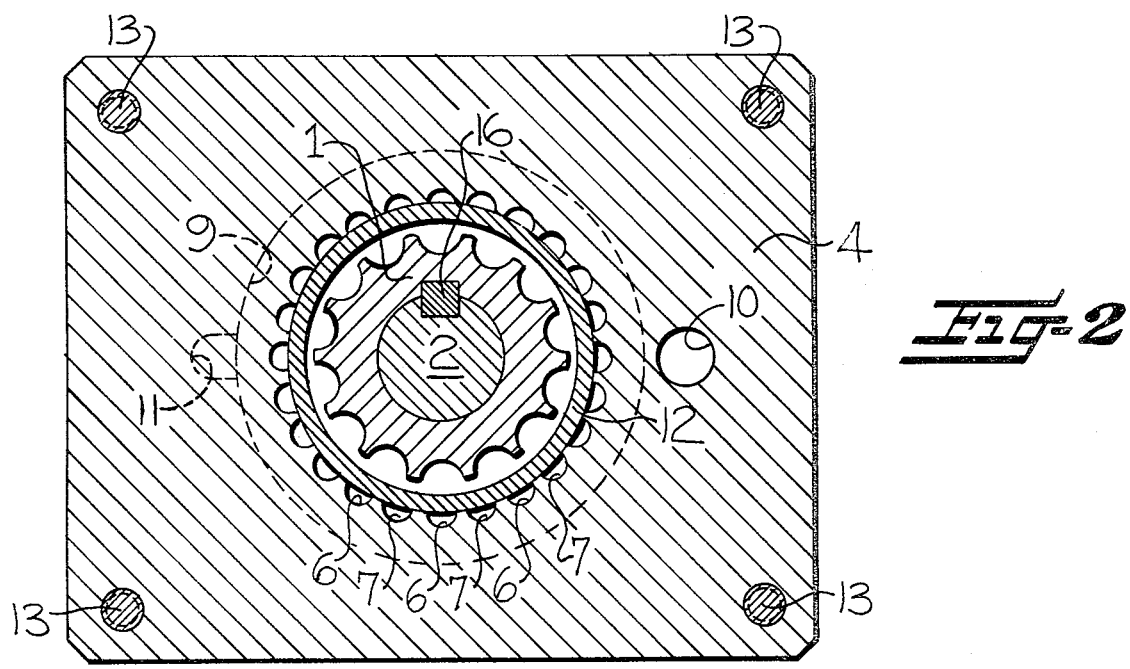
FIG. 2 is a sectional view taken substantially along the line A—A of FIG. 1.
Figure 3:
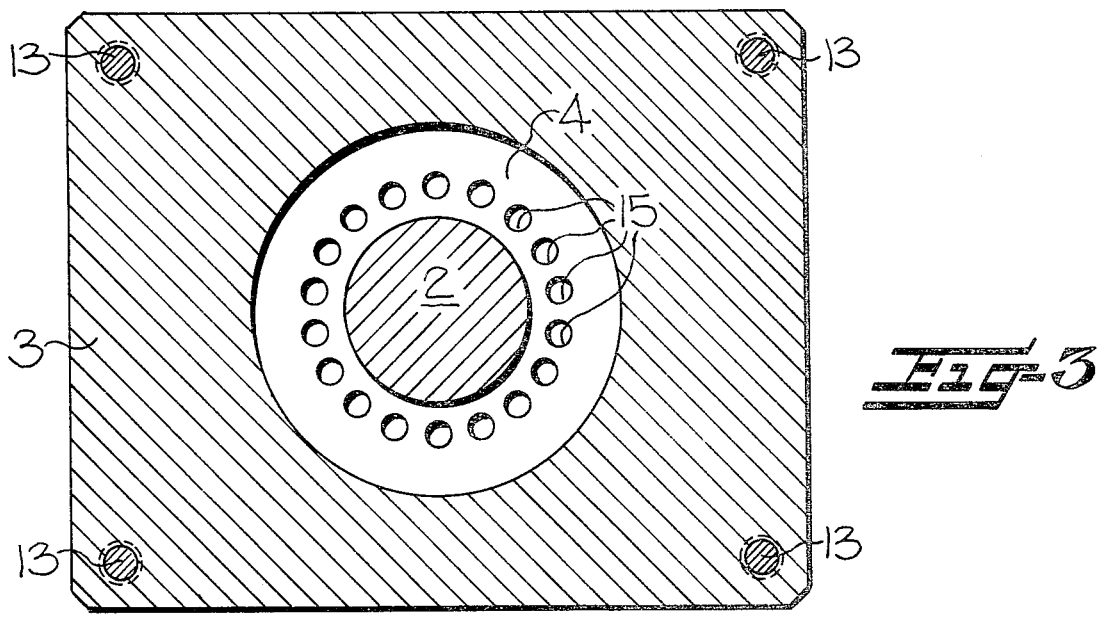
FIG. 3 is a sectional view taken substantially along the line B—B of FIG. 1.

Referring more particularly to the drawings, FIG. 1 illustrates a mixing apparatus according to the present invention, and which comprises a grooved mixing head 1 which is fixed on the rotor shaft 2, with the head being fixedly connected to the shaft by means of a key 16, note FIG. 2. The grooves extend helically on the outer cylindrical surface of the mixing head, at an angle of between about 10 and 80 degrees with respect to the axial direction. In the illustrated embodiment, the grooves are disposed at an angle of about 45 degrees. The shaft 2 is rotatably mounted in the mixer housing, which comprises the interconnected components 3 and 4, and cover 5.

Figure 4:
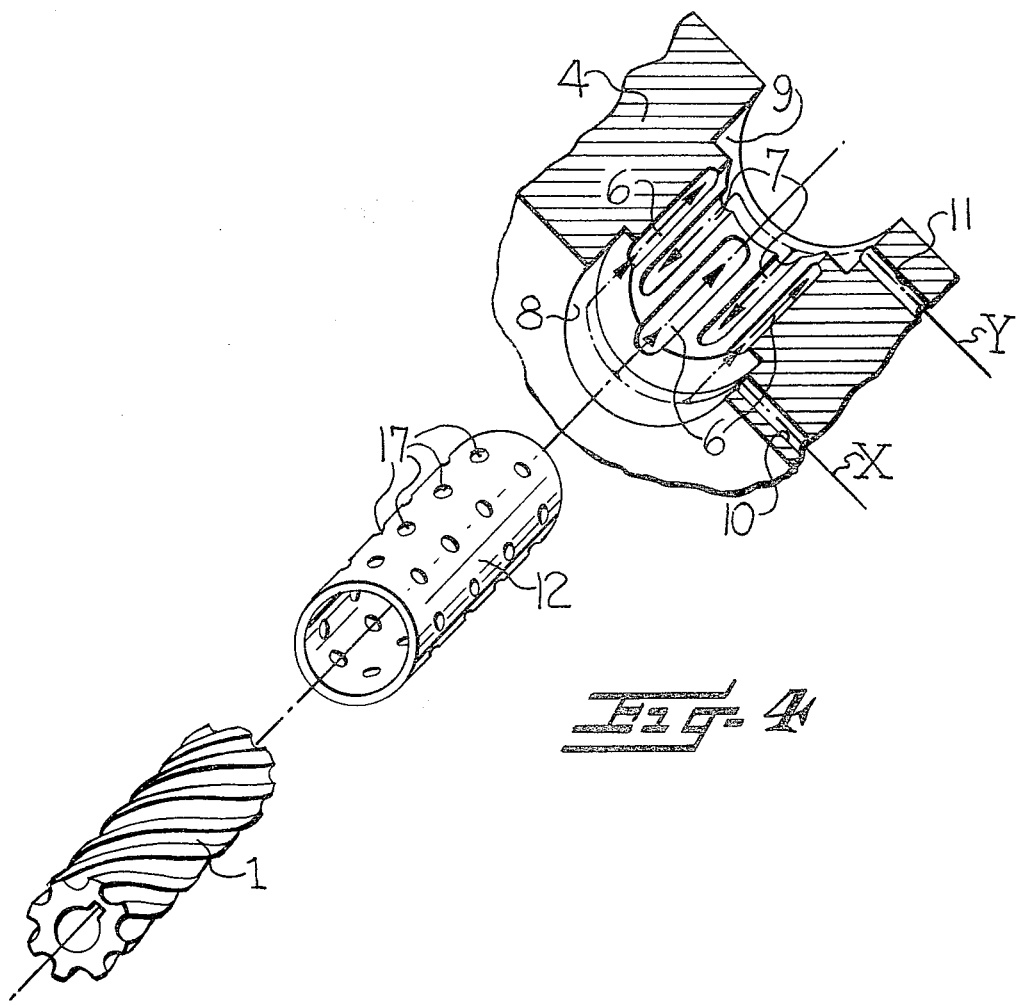
FIG. 4 is an exploded perspective view of the mixing head, sleeve, and housing of the mixing apparatus shown in FIG. 1.

As best seen in FIG. 4, the housing component 4 includes a generally cylindrical internal cavity. A first group of circumferentially spaced, axially extending channels 6 are formed in the wall of the cavity, and a second group of like channels 7 are formed in the wall, with the channels 6 and 7 being alternately arranged about the entire circumference of the cavity. The feed ducts for the components X and Y run through the housing component 4, and the housing cover 5, with the channels 6 being connected through an annular groove 8 to the line 10 feeding the component X, and the channels 7 being connected through the annular groove 9 to the line 11 feeding the component Y.

A sleeve 12 is fixedly mounted in the cavity of the housing by a press fit or the like, and the sleeve has an inner cylindrical surface which defines a mixing chamber therewithin. The mixing head 1 is coaxially disposed within the inner surface of the sleeve 12, and the outer cylindrical surface of the head is in close proximity to the inner surface of the sleeve, with the space between the inner surface of the sleeve 12 and the outer surface of the head being indicated at S. Also, the housing components 3 and 4 and the cover 5 are fixedly connected to each other by threaded bolts 13, and nuts 14.

The shaft 2 is sealingly fitted in the housing cover 5, and the housing component 4 is followed by a generally conventional "pin mixer" which serves as a second mixing chamber and which is positioned in the housing component 3. The pin mixer is thus disposed coaxially downstream of the mixing chamber defined by the sleeve 12, and the pin mixer is operatively connected to such first mixing chamber through holes 15. The structural components of the pin mixer are generally known in the art, and therefore are not described herein in more detail.

FIG. 4 is an exploded view of the mixing head 1, the sleeve 12, and the housing component 4, and illustrates the embodiment wherein the sleeve 12 is provided with a plurality of distinct, radial openings 17. More particularly, the openings 17 are arranged in axially extending sets of equally spaced apart openings, with each set being in communication with one of the channels 6 or 7. This view further illustrates the lines 10 and 11, and the manner in which the components move through the annular grooves 8 and 9 to the axial channels 6 and 7 respectively. The components X and Y are supplied to the mixing head 1 via the distinct radial openings 17 in the sleeve 12. In this regard, it will be understood that the size of the openings 17 may vary from set to set, with the size being determined by the viscosity of the particular component and the desired flow rate.

A specific example of the operation of the mixing apparatus will now be described. In the described example, the sleeve 12 comprises a porous metallic material, and the component X comprises a polypropylene having a viscosity of 7000 Pas, a temperature of 235° C., and a flow rate of 12 g/min., and the component Y is a fatty amine with a viscosity of 0.03 Pas, a temperature of 180° C. and a flow rate of 4 g/min. The components are fed to the apparatus by suitable gear pumps or the like. The polypropylene is supplied to the porous sleeve 12 via the feed line 10, the annular groove 8, and the axial channels 6, whereas the fatty amine reaches the sleeve via feed line 11, annular groove 9, and axial channels 7. Upon entering the porous sleeve, the individual streams of the components are divided into even smaller individual streams, and during passage through the wall of the sleeve, these streams come into contact with each other, are partly mixed, and then again divide. Thus the individual streams emerging from the porous metal sleeve are differently composed, and for this reason, the liquid flowing into the mixing space between the head 1 and the sleeve 12 is referred to below as the "medium". The surface of the grooved mixing head is provided with helical grooves arranged at an angle of 45 degrees, and is spaced a distance of about 500 microns from the bore of the sleeve. The head is rotated in such a manner that the medium emerging from the sleeve 12 is sheared immediately upon entering the mixing chamber, and at a point immediately adjacent the wall of the sleeve. The sheared medium is conveyed in the direction of the holes 15 by the force of the transverse shearing operation at a velocity which is greater than that of the medium passing through the holes. Thus the medium in the mixing chamber exerts a force on the streams entering the chamber which is in a direction opposite the direction of the force applied during the transverse shearing step. For this reason, part of the medium is forced to flow back into the sleeve 12. The advantage of this shearing effect and the repeated mixing of the medium flowing against the conveying direction, is that the medium is mixed very thoroughly. This mixing effect is further enhanced by the mixing which takes place in the second mixing chamber in the housing component 3, which is downstream of the first mixing chamber. As will be apparent, this second mixing chamber may take a variety of different forms.

The medium which leaves the illustrated pin mixer had a viscosity of 40 Pas and a temperature of 200° C. The mixture was essentially homogeneous, and had the properties of a melt. Even where the amount of polypropylene contained in the mixture was reduced to 20 percent, this mixture will be essentially homogenous, and still have the properties of a melt.

Figure 5:
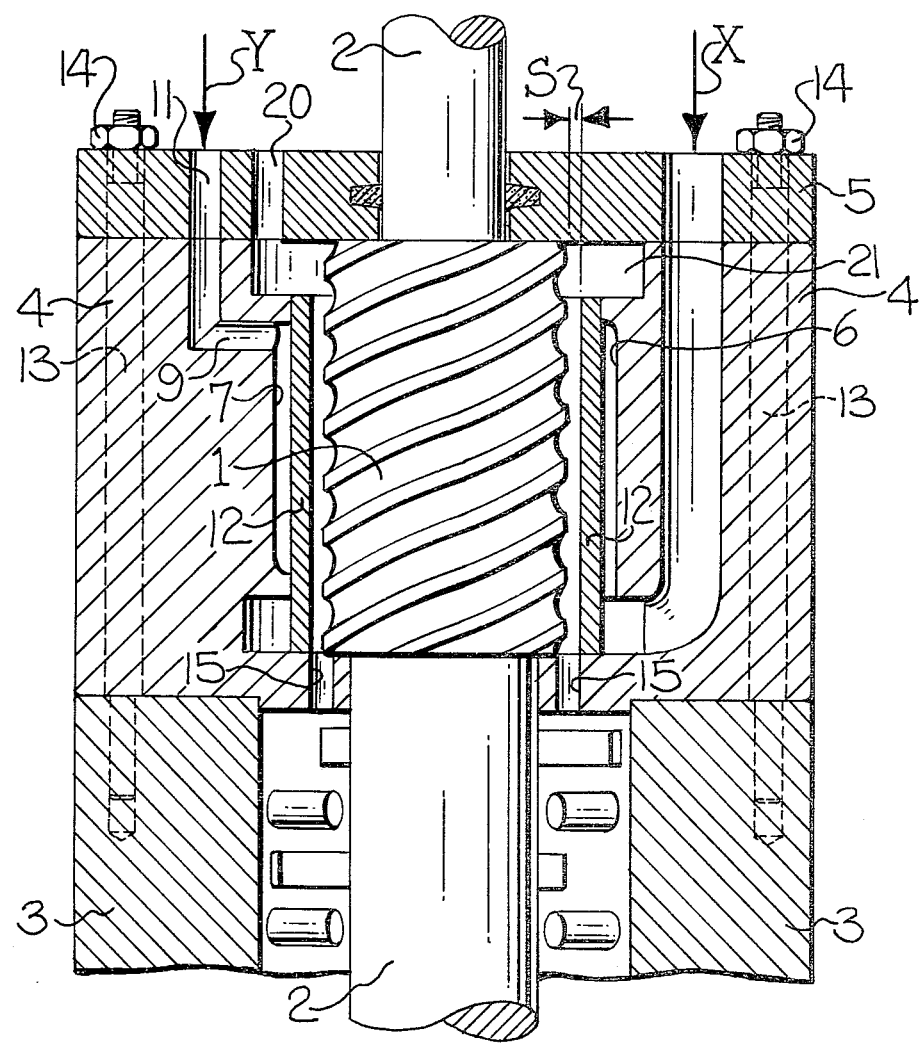
FIG. 5 is a sectional elevation view of another embodiment of a mixing apparatus according to the present invention.

The embodiment of FIG. 5 generally corresponds to the embodiment of FIG. 1, with the exception that a main component Z may be axially fed into the mixing chamber between the sleeve 12 and the mixing head 1 via a channel 20 in the cover 5, and an annular channel 21 in the housing component 4. The other components X and Y are radially fed into the space via openings provided in the sleeve 12. This embodiment permits the feeding of a main stream of a liquid, for example a polymer melt, with small quantities of one or more liquid components which are to be added to the main liquid stream.

In the drawings and specification, there has been set forth preferred embodiments of the invention, and although specific terms are employed, they are used in a generic and descriptive sense only and not for purposes of limitation.

That which is claimed is:

1. An apparatus for mixing at least two fluids, and comprising
a housing, a sleeve fixedly mounted in said housing and having an inner cylindrical surface which defines a first mixing chamber therewithin, a second mixing chamber disposed in said housing in coaxial communication with said first mixing chamber, a rotor rotatably mounted in said housing and extending coaxially through said first and second mixing chambers, said rotor including a mixing head having an outer cylindrical surface which is in close proximity to the inner surface of said sleeve, and with said outer surface including at least one helical groove therein, first duct means including a first set of openings extending radially through said sleeve for conveying a first fluid radially into said mixing chamber, second duct means including a second set of openings extending radially through said sleeve for conveying a second fluid radially into said mixing chamber, and means for rotating said rotor relative to said sleeve and housing, whereby first and second fluids moving through said first and second duct means are adapted to radially enter the first mixing chamber through the respective first and second sets of openings and be sheared by contact with the outer surface of the rotating mixing head, and with the fluids then being conveyed through the second mixing chamber.

2. The apparatus as defined in claim 1 wherein the openings of each of the first and second sets of openings comprise distinct, spaced apart, radial passages.

3. The apparatus as defined in claim 1 wherein said sleeve is composed of a porous metal, with the pores of the metal defining each of the first and second sets of openings.

4. The apparatus as defined in claim 3 wherein the average size of said pores ranges between about 5 and 200 microns.

5. The apparatus as defined in claim 1 wherein each of said first and second duct means further includes a plurality of axially extending channels formed in said housing and communicating with the associated openings at the outer surface of said sleeve.

6. The apparatus as defined in claim 5 wherein said first duct means further includes an annular groove in said housing at one end of said sleeve and communicating with the associated axially extending channels, and wherein said second duct means further includes a second annular groove in said housing at the opposite end of said sleeve and communicating with the associated axially extending channels.

7. The apparatus as defined in claim 1 further including an opening in said housing at the end of said sleeve remote from said second mixing chamber for admitting a third fluid axially into said first mixing chamber.

8. The apparatus as defined in claim 1 wherein each of the helical grooves on said mixing head is disposed at an angle between about 10 to 80 degrees with respect to the axial direction.

9. An apparatus for mixing at least two fluids, and comprising a housing, a sleeve fixedly mounted in said housing and having an inner cylindrical surface which defines a mixing chamber therewithin and including a plurality of openings extending radially through said sleeve, a mixing head rotatably mounted in said housing and coaxially disposed in said mixing chamber, said mixing head having an outer cylindrical surface which is in close proximity to the inner surface of said sleeve and with said outer cylindrical surface having at least one helical groove therein, first duct means for conveying a first fluid through a first portion of said openings of said sleeve radially into said mixing chamber, additional duct means for conveying an additional fluid through an additional portion of said openings of said sleeve radially into said mixing chamber, and means for rotating said mixing head relative to said housing and sleeve, whereby a first fluid moving through said first duct means and an additional fluid moving through said second duct means are adapted to radially enter the mixing chamber and be sheared by contact with the rotating mixing head and thereby be mixed.

10. The apparatus as defined in claim 9 wherein each of said first and additional duct means further includes at least one channel formed in said housing and communicating with the associated openings at the outer surface of said sleeve.

11. The apparatus as defined in claim 9 wherein said housing includes a generally cylindrical internal cavity and said sleeve is coaxially disposed in said cavity, and wherein said first duct means further includes a first group of circumferentially spaced, axially extending channels formed in the wall of said internal cavity, with each of said first group of channels communicating with a plurality of said openings at the outer surface of said sleeve, and wherein said additional duct means further includes a second group of circumferentially spaced, axially extending channels formed in the wall of said internal cavity, with each of said second group of channels communicating with a plurality of said openings at the outer surface of said sleeve.

12. The apparatus as defined in claim 11 wherein said first duct means further includes an annular groove in said housing at one end of said sleeve and communicating with said first group of axially extending channels, and said additional duct means further includes a second annular groove in said housing at the opposite end of said sleeve and communicating with said second group of axially extending channels.

13. The apparatus as defined in claim 9 further comprising further duct means for conveying a further fluid into said mixing chamber in an axial direction at one end of said sleeve.

14. The apparatus as defined in claim 9 wherein each of said first portion and said additional portion of said openings comprise distinct, spaced apart, radial passages.

15. The apparatus as defined in claim 9 wherein said sleeve is composed of a porous metal, with the pores of the metal defining each of said first portion and said additional portion of said openings.

16. The apparatus as defined in claim 15 wherein the average size of said pores ranges between about 5 and 200 mm.

17. The apparatus as defined in claim 9 wherein said mixing head includes a plurality of helical grooves in said outer cylindrical surface thereof, with said helical grooves being disposed at an angle between about 10 to 80 degrees with respect to the axial direction.

18. The apparatus as defined in claim 9 wherein the width of the space between said inner cylindrical surface of said sleeve and said outer cylindrical surface of said mixing head is between 0.2 and 5 mm.

19. A method of mixing at least two distinct fluids and comprising the steps of
feeding a first fluid in the form of a plurality of relatively small streams radially through the wall of a sleeve and into a mixing chamber defined therewithin,
feeding an additional fluid in the form of a plurality of relatively small streams radially through the wall of the sleeve and into said mixing chamber,
transversely shearing the streams of the first fluid and the streams of the additional fluid immediately upon entering the mixing chamber and at a point immediately adjacent the wall of the sleeve, and
mixing the first fluid and the additional fluid in the mixing chamber.

20. The method as defined in claim 19 comprising the further step of conveying the sheared fluids from the first mentioned mixing chamber into and through a second mixing chamber, while further mixing the fluids as they pass through the second mixing chamber.

21. The method as defined in claim 20 comprising the further step of feeding a further fluid axially into the first mentioned mixing chamber so as to be mixed with the sheared fluids therein.

22. The method as defined in claim 19 wherein the steps of feeding the first and second fluids into the mixing chamber each include dividing the fluid into a plurality of separate, radially directed streams.

23. The method as defined in claim 19 wherein the steps of feeding the first and additional fluids into the mixing chamber include dividing each of the fluids into myriad small streams while within the wall of said sleeve, and therein pre-mixing the small streams of the two fluids with one another prior to entering the mixing chamber.

24. The method as defined in claim 19 wherein the mixture of the fluids in the mixing chamber exerts a force on the streams entering the chamber which is in a direction opposite the direction of the force applied during the transverse shearing step, to thereby provide a re-mixing effect.

25. The method as defined in claim 19 wherein the steps of transversely shearing the first and additional streams each include contacting the streams with a rotating mixing head which is disposed within said mixing chamber.

26. The method as defined in claim 25 wherein the step of contacting the streams with said rotating mixing head acts to convey the fluids toward a discharge end of the mixing chamber at a substantially greater flow rate than can be discharged from said end, to thereby provide a remixing effect.

* * * * *